(12) United States Patent
Bleidorn-Piper

(10) Patent No.: US 12,238,642 B2
(45) Date of Patent: *Feb. 25, 2025

(54) SYSTEM AND METHOD TO DETECT AND MANAGE WIRELESS TETHERING

(71) Applicant: Charter Communications Operating, LLC, St. Louis, MO (US)

(72) Inventor: Timothy Clark Bleidorn-Piper, Colorado Springs, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,253

(22) Filed: Apr. 11, 2023

(65) Prior Publication Data
US 2023/0247536 A1    Aug. 3, 2023

Related U.S. Application Data

(63) Continuation of application No. 17/168,691, filed on Feb. 5, 2021, now Pat. No. 11,653,294.

(51) Int. Cl.
| | | |
|---|---|---|
| *H04W 48/16* | (2009.01) | |
| *H04W 28/22* | (2009.01) | |
| *H04W 76/10* | (2018.01) | |
| *H04W 88/16* | (2009.01) | |

(52) U.S. Cl.
CPC ........... *H04W 48/16* (2013.01); *H04W 28/22* (2013.01); *H04W 76/10* (2018.02); *H04W 88/16* (2013.01)

(58) Field of Classification Search
CPC ............................. H04W 4/70; G06F 12/1408
See application file for complete search history.

(56) References Cited

U.S. PATENT DOCUMENTS

| | | | |
|---|---|---|---|
| 10,412,633 B1* | 9/2019 | Kotecha | H04L 43/0888 |
| 2016/0335876 A1* | 11/2016 | Verma | G01S 11/06 |
| 2017/0156090 A1* | 6/2017 | Bhumkar | H04W 12/062 |
| 2017/0181038 A1* | 6/2017 | Yeddala | H04L 41/0893 |
| 2017/0196044 A1* | 7/2017 | Nord | H04W 28/0838 |
| 2018/0124693 A1* | 5/2018 | Ringland | H04W 40/12 |
| 2018/0199274 A1* | 7/2018 | Krishnan | H04W 48/12 |
| 2019/0182763 A1* | 6/2019 | Geller | H04W 72/21 |

\* cited by examiner

*Primary Examiner* — Fabricio R Murillo Garcia
(74) *Attorney, Agent, or Firm* — Armis IP Law, LLC

(57) ABSTRACT

According to one configuration, a gateway establishes a wireless communication link with a first communication device. The first communication device has access to a remote network via a path including the wireless communication link and a communication link though the gateway. The communication management hardware receives a notification indicating attributes of a wireless interface of the first communication device. The gateway or other suitable entity monitors for presence of wireless communications from the wireless interface advertising availability of a wireless service provided by the first communication device. In response to detecting the availability of or actual use of the wireless service as advertised by a wireless communication transmitted from the first communication device, the gateway controls a bandwidth provided to the first communication device to access the first communication device.

32 Claims, 11 Drawing Sheets

SYSTEM AND METHOD TO DETECT AND MANAGE WIRELESS TETHERING

RELATED APPLICATION

This application is a continuation application of earlier filed U.S. patent application Ser. No. 17/168,691 entitled "SYSTEM AND METHOD TO DETECT AND MANAGE WIRELESS TETHERING," filed on Feb. 5, 2021, the entire teachings of which are incorporated herein by this reference.

BACKGROUND

Modern mobile devices can be configured to set up a Wi-Fi™ interface and broadcast an ad-hoc Wi-Fi™ SSID used to share the mobile device's internet Wi-Fi™ access with other devices within range. In such an instance, the primary communication device setting up the wireless interface provides a second communication device access to a network through the first communication device. This feature is referred to as a personal hotspot, or tethering by the first communication device.

Several forms of conventional tethering exist to include wireless tethering such as using a wireless Wi-Fi™ standard. Alternatively, conventional techniques include wired tethering such as implementation of a physical cable (adapter) to directly connect to the second communication device to the first communication device.

In the past, mobile handsets capable of providing tethering services to other communication devices have allowed connected devices to share the handset's LTE (Long Term Evolution) data connection. To date, wireline Internet Service Providers have given the impact of this technology little thought as the data connection does not traverse the ISP network. Further, a paradigm existed whereby technical limitations of the handset did not allow for concurrent Wi-Fi™ connections to be active (one to connect the handset to a highspeed wireline network, and one to allow tethered devices to connect to the handset), thereby limiting the 'sharing' of the handset's Internet access to use of the LTE network connection for the Internet access portion of a connection.

Current mobile communication device handsets have begun to support dual Wi-Fi™ ad-hoc tethering, allowing a handset to connect to a high-speed ISP (Internet Service Provider) Wi-Fi™ network while simultaneously broadcasting a personal hotspot network to which other devices can connect and utilize the ISP internet connection. This effectively provides a tethered device access to the high-speed wireline ISP data network via the Wi-Fi™ to Wi-Fi™ link provided by the handset.

BRIEF DESCRIPTION OF EMBODIMENTS

There are deficiencies associated with conventional techniques of managing implementation of tethering by communication devices in a wireless network environment. For example, it is sometimes difficult for a wireless network service provider to detect and/or control operation of communication device providing tethering capabilities to other communication devices in a wireless network environment.

Embodiments herein provide an improved way of controlling access to a remote network when tethering is detected or advertised as available.

First Embodiments

More specifically, a gateway establishes a wireless communication link with a first communication device. The gateway provides the first communication device access to a remote network. The gateway or other suitable entity monitors operation of the first communication device. In response to detecting that the first communication device implements a wireless interface supporting a tethering mode, the gateway executes a control function such as adjusting a bandwidth rate (bandwidth limit) of communications permitted between the first communication device through the gateway to the remote network.

In accordance with further example embodiments, the gateway provides a first data rate service (up to a first bandwidth value) to the first communication device to access the remote network prior to detecting that the first communication device implements the tethering mode. The gateway provides a second data rate service (such as up to a second bandwidth value) to the first communication device to access the remote network subsequent to detecting that the first communication device implements a wireless interface supporting a tethering mode. In one embodiment, the first bandwidth limit is greater than the second bandwidth limit such that the user of the first communication device is penalized when operating in the tethering mode.

Alternatively, the second bandwidth limit is greater than the first bandwidth limit such that the user of the first communication device is provided more bandwidth when operating in the tethering mode. In one embodiment, the operator of the first communication device may be charged an extra fee to operate in the tethering mode in which the first communication device is provided additional bandwidth.

Further embodiments herein include, via the gateway, detecting that the first communication device implements the wireless interface supporting the tethering mode in response to receiving a wireless communication transmitted from the wireless interface of the first communication device indicating the availability of the wireless service.

Note that further details of implementing embodiments herein are further discussed below in the detailed description and corresponding drawings.

Second Embodiments

According to further example embodiments, communication management hardware such as in a gateway or other suitable entity establishes a wireless communication link with a first communication device. The first communication device has access to a remote network via a combination of the wireless communication link and the gateway. The communication management hardware (such as internal or external to a gateway) receives a notification indicating attributes of a wireless interface of the first communication device. Additionally, the communication management hardware monitors for presence of wireless communications from the wireless interface advertising availability of a wireless connection service provided by the first communication device. In response to detecting the availability of the wireless connection service as advertised by a wireless communication transmitted from the first communication device, the communication management hardware applies a data rate adjustment to the wireless communication link.

In further example embodiments, in response to detecting the availability of the wireless connection service advertised via a wireless communication transmitted from the wireless interface of the first communication device, the communication management hardware applies a data rate adjustment to the wireless communication link. For example, in one embodiment, the communication management hardware provides a first data rate service over the wireless communication link prior to receiving the wireless communication indicating availability of the wireless connection service. The communication management hardware provides a second data rate service over the wireless communication link subsequent to receiving the wireless communication indicating the wireless connection service advertised by the wireless interface of the first communication device, the second data rate being less than the first data rate.

In further example embodiments, the attributes of the wireless interface include: i) a first unique network address used by the first communication device to establish the wireless communication link, and ii) a second unique network address assigned to the wireless interface to wirelessly communicate data to a second communication device.

Further embodiments herein include, via the communication management hardware, in response to receiving a wireless communication from the wireless interface of the first communication device indicating the availability of the wireless connection service, communicating a message from a gateway to a communication management resource, the message indicating operation of the first communication device as a wireless service provider. In one embodiment, the communication management hardware (such as gateway) receives a command controlling use of the wireless communication link in response to communicating the message to the communication management resource.

In still further example embodiments, monitoring for presence of wireless communications includes: wirelessly transmitting a probe request from the communication management hardware (such as gateway) and receiving a wireless communication from the wireless interface of the first communication device. In one embodiment, the wireless communication is a probe response communicated from the wireless interface.

Still further example embodiments herein include, via the notification, receiving a unique network address assigned to the wireless interference of the first communication device. In one embodiment, the communication management hardware receives the notification of attributes of the wireless interface of the first communication device over the wireless communication link.

In accordance with yet further example embodiments, the communication management hardware receives a time value. In response to detecting a condition in which the wireless interface of the first communication device does not advertise the availability of the wireless connection service for a duration of time greater than the time value, the communication management hardware applies a data rate adjustment to the wireless communication link. In one embodiment, the communication management hardware provides a first data rate service over the wireless communication link prior to detecting the condition. The communication management hardware provides a second data rate service over the wireless communication link subsequent to detecting the condition. The second data rate is greater than the first data rate.

Third Embodiments

A network environment includes a first communication device. The first communication device establishes a first wireless communication link with a gateway. The first wireless communication link provides the first communication device access to a remote network through the gateway. The first communication device provides a notification to a remote entity such as communication management hardware; the notification indicates attributes of a wireless interface of the first communication device. The first communication device then transmits a wireless communication from the wireless interface of the first communication device advertising availability of the wireless connection service.

Further embodiments herein include, via the first communication device, in response to transmitting the wireless communication from the wireless interface: i) receiving a communication from a second communication device in the network environment; and ii) establishing a wireless communication link between the wireless interface of the first communication device and the second communication device. The first communication device then receives data wirelessly communicated from the second communication device over the second wireless communication link. The first communication device then communicates the data over the first wireless communication link through the gateway and another communication link to the remote network. Thus, in one embodiment, the first communication device serves as a wireless access point to the second communication device and provides the second communication device access to the remote network.

In further example embodiments, the first communication device monitors for presence of wireless communications such as probe requests. In response to receiving a probe request, the first communication device transmits a wireless communication from the wireless interface of the first communication device. In one embodiment, the wireless communication is a probe response advertising availability of a respective wireless service.

Thus, embodiments herein provide novel ways of providing improved use of wireless channels amongst different entities sharing use of bandwidth in a wireless network environment.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium and/or system having instructions stored thereon to facilitate control or management of communications in a network environment. The instructions, when executed by computer processor hardware, cause the computer processor hardware (such as one or more co-located or disparately processor devices) to: establish a wireless communication link with a first communication device, the wireless communication link providing the first communication device access to a remote network; receive a notification indicating attributes of a wireless interface of the first communication device; and monitor for presence of wireless communications from the wireless interface advertising availability of a wireless service provided by the first communication device; and in response to detecting the availability of the wireless service advertised via a wireless communication transmitted from the wireless interface of the first communication device, apply a data rate adjustment to the wireless communication link.

Another embodiment includes a computer readable storage medium and/or system having instructions stored thereon to facilitate control or management of communications in a network environment. The instructions, when executed by computer processor hardware, cause the computer processor hardware (such as one or more co-located or disparately processor devices) to: establish a wireless communication link between a gateway and a first communication device, the gateway providing the first communication device access to a remote network; monitor operation of the first communication device; and in response to detecting that the first communication device implements a wireless interface supporting a tethering mode, adjust a bandwidth rate of communications permitted between the first communication device through the gateway to the remote network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
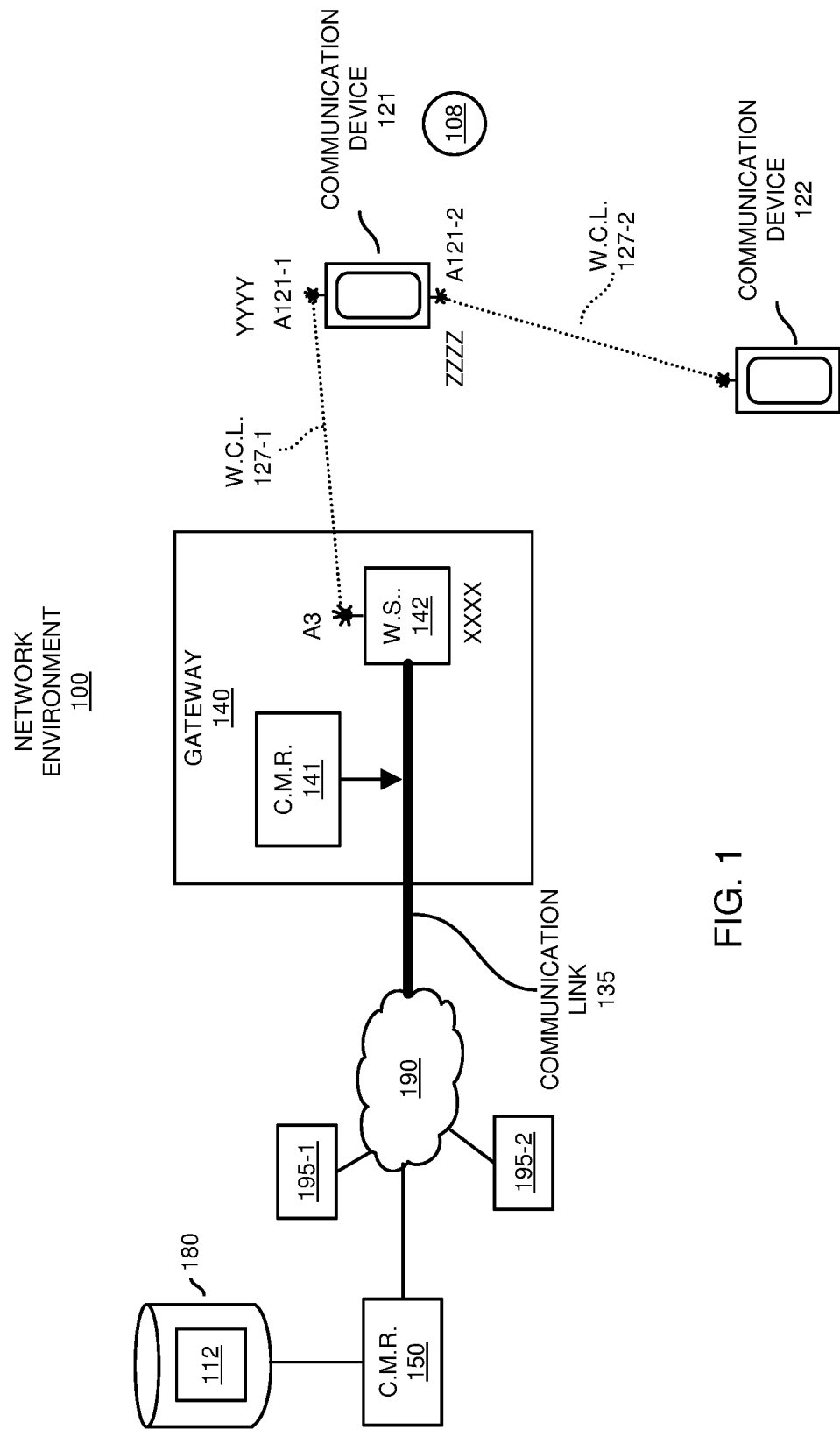
FIG. 1 is an example diagram illustrating a first communication device providing wireless connectivity to a second communication device via a wireless tethering mode according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one configuration, communication management hardware such as in a gateway establishes a wireless communication link with a first communication device. The wireless communication link is part of a corresponding communication path between the gateway and a remote network. In one embodiment, the gateway receives a notification indicating attributes of a wireless interface of the first communication device. The gateway monitors for presence of wireless communications from the wireless interface of the first communication device advertising availability of a wireless connection service provided by the first communication device to one or more other communication devices.

In response to detecting the availability or actual implementation of the wireless connection service as advertised by a wireless communication transmitted from the first communication device, the gateway executes an appropriate control function such as applying a data rate bandwidth adjustment to the wireless communication link and/or wireless path between the first communication device and the remote network. As discussed herein, the bandwidth reduction applied to communications associated with the first mobile communication device inhibits the first communication device from providing wireless tethering services to other communication devices in a network.

When the gateway or other suitable entity detects that the first communication device discontinues providing wireless tethering services to the second communication device, the gateway applies another data rate bandwidth adjustment to increase a bandwidth of providing the first communication device access to the remote network. Thus, in one embodiment, when the first communication device provides tethering services, the first communication device is provided a lower bandwidth data rate.

Now, more specifically, FIG. 1 is an example diagram illustrating a wireless network environment implementing tethering control according to embodiments herein.

As shown in this example embodiment, network environment 100 includes communication management resource 150, network 190 (such as including the Internet, wireless infrastructure, etc.), gateway 140, communication device 121, and communication device 122.

The gateway 140 includes communication management resource 141 and wireless station 142 (such as a wireless access point, wireless base station, customer premises equipment, etc.).

Each communication device is mobile or stationary with respect to wireless station providing it access to network 190.

Note that each of the resources (such as gateway, wireless stations, communication devices, communication management resources, etc.) in network environment 100 can be configured to include appropriate hardware, software, or combination of hardware and software to carry out respective operations as discussed herein.

More specifically, gateway 140 can be configured as gateway hardware, gateway software, or a combination of gateway hardware and gateway manager software; wireless station 142 can be configured as wireless station hardware, wireless station software, or a combination of wireless station hardware and wireless station software; communication management resource 141 can be configured as communication management hardware, communication management software, or a combination of communication management hardware and communication management software; communication device 121 can be configured as communication hardware, communication software, or a combination of communication hardware and communication software; communication device 122 can be configured as communication hardware, communication software, or a combination of communication hardware and communication software; communication management resource 150 can be configured as communication management hardware, communication management software, or a combination of communication management hardware and communication management software; etc.

In one embodiment, the gateway 140 establishes a wireless communication link 127-1 with a first communication device 121. The first communication device 121 has access to the remote network 190 and corresponding one or more server resources 195-1, 195-2, etc., via communications over a communication path including wireless communication link 127-1, gateway 140, and communication link 135.

In one embodiment, the gateway 140 receives a notification indicating attributes of a wireless interface A121-2 of the first communication device 121. Additionally, the gateway 140 monitors for presence of wireless communications (a beacon or probe response) from the wireless interface A121-2 advertising availability of a wireless connection service provided by the first communication device 121.

In accordance with further example embodiments, the communication management resource 150 (or other suitable resource) manages operation of one or more communication devices (such as including communication device 121) in the network environment 100.

For example, via configuration information 112 stored in repository 180, the communication management resource keeps track of one or more services subscribed by the user 108. In one embodiment, the configuration information includes the network address YYYY assigned to the communication device 121 and corresponding subscription information. The communication management resource 150 uses the network address YYYY assigned to the communication device 121 to identify services to be provided to the communication device 121. For example, the configuration information 112 can be configured to indicate to provide the communication device 121 assigned network address YYYY a bandwidth of 1 GHz (or other suitable value) to access remote network 190 in a non-tethering mode and 100 MHz when operating in a tethered mode.

As further discussed herein, in response to detecting the availability of the wireless connection service as advertised by a wireless communication transmitted from the first communication device 121, the gateway 140 receives control input such as from communication management resource 150 or other suitable entity.

The control input indicates an appropriate one or more commands to execute based on the detected behavior of the communication device 121. In one embodiment, in response to detecting the advertising or actual use of wireless services available from the wireless interface A121-2 of the communication device 121, the communication management resource 141 associated with the gateway 140 executes an appropriate control function to modify bandwidth limits associated with the communication link 135 and/or wireless communication link 127-1 to convey communications between the communication device 121 and the remote network 190.

More specifically, in one non-limiting example embodiment, if the gateway 140 and corresponding communication management resource 141 detect that the communication device 121 advertises or provides tethering wireless services to other communication devices in network environment 100, the communication management resource 141 reduces (or potentially increases) bandwidth allocated to convey communications over the wireless communication link 127-1 and/or communication link 135.

Additionally, if the gateway 140 and corresponding communication management resource 141 detect that the communication device 121 no longer advertises availability of tethering wireless services (such as via communication link 127-2 or the like) or discontinues providing tethering wireless services to other communication devices in network environment 100, the communication management resource 141 increases (or potentially decreases) bandwidth allocated in communication link 135 and/or wireless communication link 127-1 to convey communications destined to or transmitted from the communication device 122.

Figure 2:
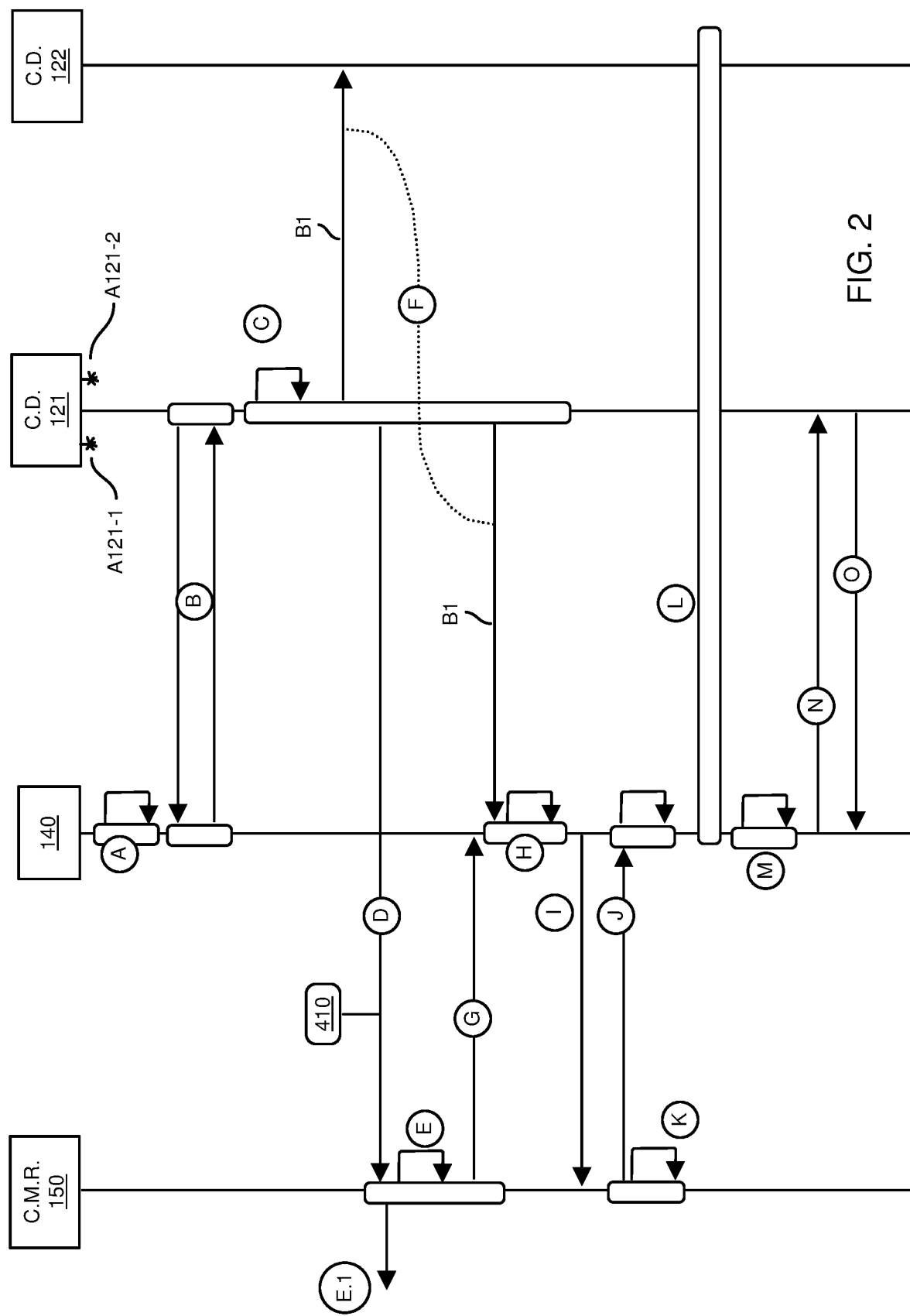
FIG. 2 is an example diagram illustrating operations and communications associated with monitoring and controlling wireless tethering by a first communication device according to embodiments herein.

FIG. 2 is an example diagram illustrating operations and communications associated with monitoring and controlling wireless tethering by a first communication device according to embodiments herein.

In processing operation A, the gateway 140 such as customer premises equipment, a public wireless access point, etc., passively and/or continuously monitor all SSID/BSSID broadcasts in its range.

In processing operation B, the communication device 121 establishes wireless communication link 127-1 with the gateway 140, connecting the communication device 121 to a wireless local area network.

In processing operation C, the operator (user 108) of the communication device 121 enables a wireless service (such as Wi-Fi™ hotspot feature) supported by the communication device 121 (such as a mobile communication device or other suitable entity). This causes the communication device 121 to create an Ad-Hoc wireless network via wireless interface A121-2 (such as assigned BSSID=ZZZZ). Further in processing operation C, the communication device 121 advertises its SSID=TIM-IPHONE; BSSID (Media Access Control or MAC address=ZZZZ) via respective transmitted wireless signal B1.

In processing operation D, managed client software (or agent) associated with communication device 121 executed on the communication device 121 records the tethering set information associated with the communication device 121 and communicates it to the policy back end (such as communication management resource 150). The communicated information in configuration information 410 includes:
  a. An SSID of the wireless interface A121-2 (such as MMP interface Ad-Hoc network such as a text string of characters describing the network such as TIM-IPHONE, i.e., operator of communication device 121).
  b. The BSSID (such as MAC address ZZZZ) of the wireless interface A121-2 (such as MMP interface Ad-Hoc network such as MAC address)
  c. The primary Wi-Fi interface (A121-1) MAC address associated with the communication device 121 (the MAC address of the interface used by the MMP to connect to the gateway 140 such as customer premises equipment Wi-Fi network.)
  d. IMEI (International Mobile Equipment Identity) of the communication device 121 such as a telephone number or other unique identifier value used in cellular services such as LTE Long Term evolution), 4G, 5G, etc.

In processing operation E, the communication management resource 150 such as including a policy system records the received tethering information (configuration information 410) such as:
  a. The SSID (string) associated with the wireless interface A121-2 (such as MMP interface Ad-Hoc network).
  b. The BSSID (MAC address) of the wireless interface A121-2 (such as MMP interface Ad-Hoc network).
  c. The primary wireless interface (such as Wi-Fi interface MAC address such as the MAC address of the interface A121-1 used by the MMP to connect to the gateway 140 such as a CPE Wi-Fi network.)
  d. IMEI of the communication device 121 supporting cellular wireless services such as LTE, etc.

Figure 7:
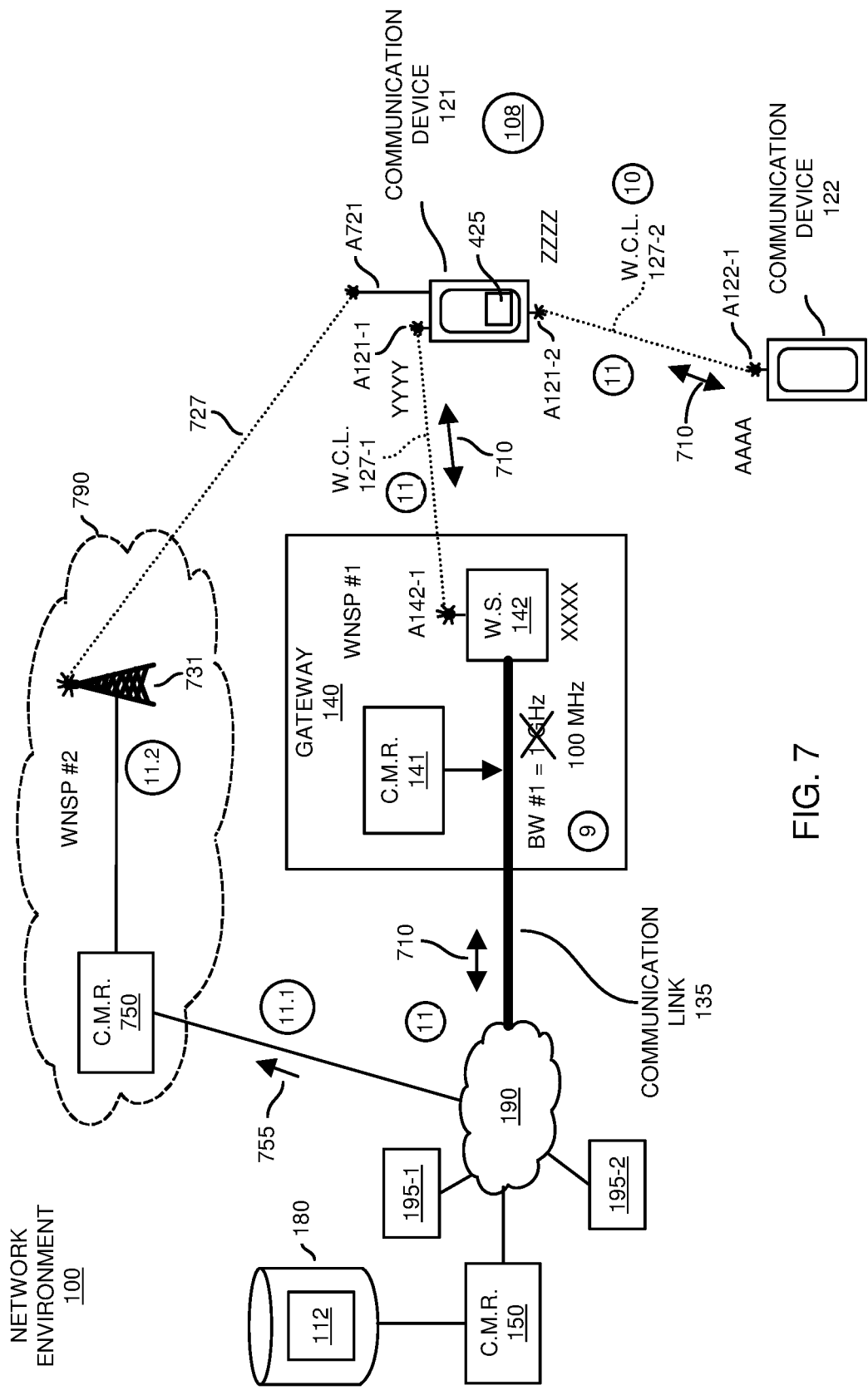
FIG. 7 is an example diagram illustrating a bandwidth adjustment applied to wireless access provided to a first communication device in response to detecting the first communication device providing tethering capability according to embodiments herein.

In optional processing operation E.1, the communication management resource 150 (such as including a policy system) may also communicate one or more messages to auxiliary systems supporting use of the communication device in network environment 100 (see also FIG. 7). In one embodiment, as shown in FIG. 2, this allows for notification of tethering activity (associated with the communication device 121) to LTE policy systems to identify the communication device 121 by a respective assigned IMEI value (unique identifier value such as phone number, network address, etc.). In one embodiment, the communication management resource 150 or other suitable entity communicates the detected tethering function associated with the communication device 121 to a second wireless network service provider (such as an LTE operator supplying wireless base station 152). This alert (such as including the unique identifier value of the communication device 121 such as phone number or other value) enables the second wireless network service provider to control bandwidth usage by the communication device 121 providing tethering services. Again, additional details of providing notification of tethering by the communication device 121 is further discussed and shown in FIG. 7.

Referring again to FIG. 2, in processing operation F, the communication device 121 communicates (broadcasts) a wireless signal (such as a beacon) in the wireless surrounding to any listening devices. In one embodiment, the wireless signal B1 represents an advertisement of wireless interface A121-2 such as an Ad-Hoc network SSID—TIM-IPHONE and BSSID=ZZZZ to communication device 122 and gateway 140.

In processing operation G, the communication management resource 150 such as including a policy system publishes the tethering information (such as configuration information 410 such as BSSID=ZZZZ, SSID=TIM-IPHONE, IMEI=775-362-8938, etc.) associated with the communication device 121.

In processing operation H, the gateway 140 and communication management resource 150 both maintain and store the tethering information set (such as configuration information 410).

In processing operation I, if the gateway 140 detects the wireless advertisement of the SSID=TIM-IPHONE/BSSID=ZZZZ in a beacon wireless signal B1 in the network environment 100, the gateway 140 reports the received advertisement event to the communication management resource 150 along with any or all information such as device identifier=YYYY assigned to the communication device 121, BSSID=ZZZZ, SSID=TIM-IPHONE, IMEI=775-362-8938, etc. For example, upon detection of the SSID=TIM-IPHONE/BSSID=ZZZZ signal from the communication device 121, the gateway 140 notifies the communication management resource 150 of the tethering capability advertised by the communication device 121 assigned network address YYYY.

In processing operation J, the communication management resource 150 (such as including policy system) determines an appropriate control action and communicates a respective command or instruction to the gateway hardware 140. In one embodiment, the command communicated to the gateway 140 directly or indirectly controls use of the communication device 121 and/or communication links 127-1, 135, etc.

In processing operation K, the communication management resource 150 can be configured to signal to auxiliary systems (such as DOCSIS/Network data plane devices involved in any special treatment of traffic to/from the wireless interface A121-2 of the communication device 121) to change behavior. See FIG. 7 for more details.

In processing operation L of FIG. 2, the wireless interface A121-2 and corresponding communication device 121 provides wireless tethering to communication device 122. The gateway 140 applies control policy (such as data rate control) to the one or more links such as wireless communication link 127-1 and/or communication link 135 to control data traffic originating from or transmitted to the communication device 121.

In accordance with further example embodiments, in processing operation M, the gateway 140 receives timer information and implements a timer to determine if the wireless interface A121-2 has been disabled. For example, the timer information may specify a time value such as 120 seconds. Via wireless station 142, the gateway 140 determines via wireless monitoring of communications B1 whether the communication device 121 has not transmitted a respective beacon (wireless station B1) from wireless interface A121-2 for a duration of 120 seconds. If so, this indicates that the wireless interface A121-2 has been disabled. In such an instance, the gateway 140 discontinues application of a respective control policy and allows higher bandwidth communications between the communication device 121 and the remote network 190.

In processing operation N, the wireless station 142 of gateway 140 communicates a wireless probe request to any wireless stations present in the network environment 100.

In processing operation O, if the wireless interface A121-2 responds with a wireless probe response indicates availability, the communication management resource 142 of gateway 140 applies an appropriate policy (such as higher or lower data rate) to control the communication device and/or respective wireless communication links in a manner as previously discussed.

Figure 3:
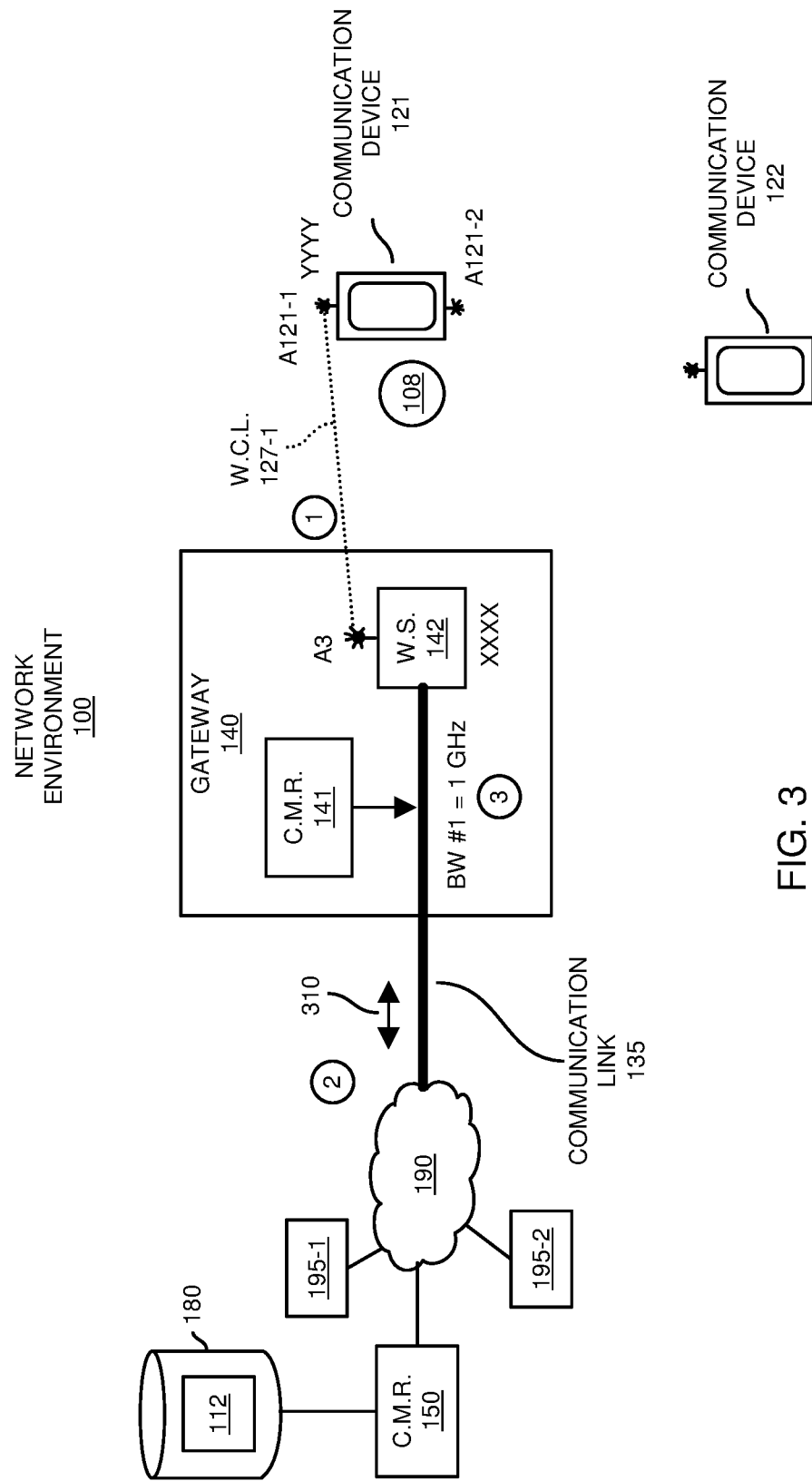
FIG. 3 is an example diagram illustrating wireless connectivity of a first communication device to a remote network and initial bandwidth control according to embodiments herein.

FIG. 3 is an example diagram illustrating wireless connectivity of a first communication device to a remote network and initial bandwidth control according to embodiments herein.

As further shown, in operation #1, the communication device 121 establishes a respective wireless communication link 127-1 between the communication device 121 and the wireless station 142 (assigned network address XXXX) of gateway 140. The communication device 121 uses the network address YYYY as its source network address for the wireless interface A121-1.

In operation #2, via communications 310, the communication management resource 141 of gateway 140 communicates through network 190 to the communication management resource 150. In one embodiment, the communication management resource 141 notifies the communication management resource 150 of a respective wireless connectivity of the communication device 121 to the wireless station 142.

In operation #3, via communications 310, the communication management resource 150 notifies the communication management resource 141 of a respective initial bit rate policy in which to provide the communication device 120 access to the remote network 190 and corresponding one or more servers 195-1, 195-2, etc. In such an instance, the communication management resource 141 receives a data rate policy BW #1 of a maximum of 1 GHz (or other suitable value) throughput with respect to one or more of communication link 135, wireless communication link 127-1. Thus, in the event that no tethering is detected with respect to the communication device 121, the communication device 121 is provided a high bandwidth rate of 1 GHz (or other suitable value).

Figure 4:
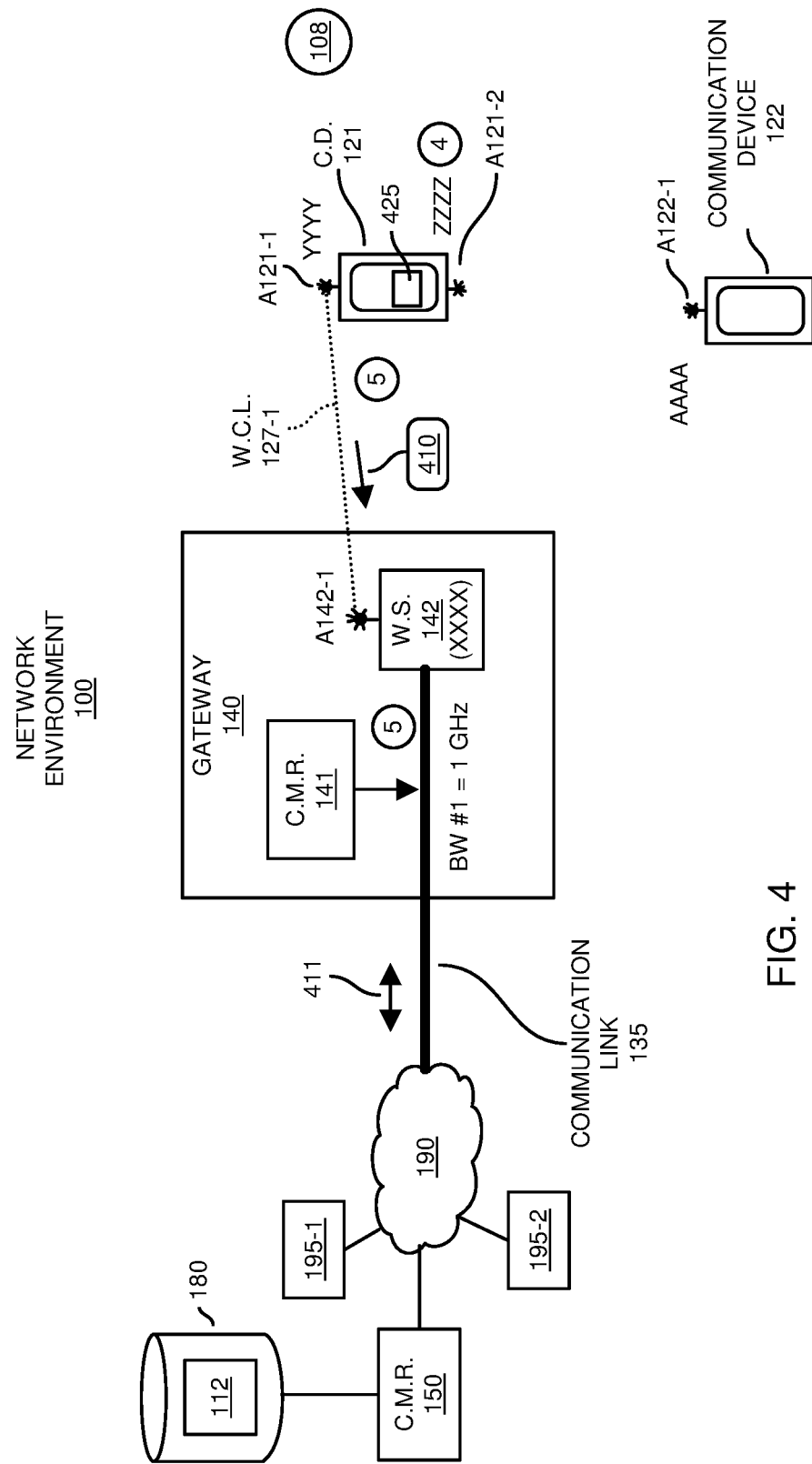
FIG. 4 is an example diagram illustrating a first communication device establishing a wireless communication link to access a remote network according to embodiments herein.

FIG. 4 is an example diagram illustrating a first communication device establishing a wireless communication link to access a remote network according to embodiments herein.

In operation #4, the communication device 121 establishes a respective wireless interface A121-2 (assigned unique network address ZZZZ).

As previously discussed, the first communication device 121 establishes a first wireless communication link 127-1 with wireless station 142 of gateway 140. The first wireless communication link 127-1 provides the first communication device 121 access to a remote network 190 through the gateway 140.

In operation #5, the agent 425 (executed application or hardware) of the first communication device 121 produces and transmits a notification 410 to a remote entity such as wireless station 142, communication management resource 141, and/or communication management resource 150. Thus, in one embodiment, the communication device 121 includes agent 425 (agent hardware and/or executed agent software) such as an application present on the communication device 121. The agent 425 monitors actions of the user 108 and/or communication device 121 itself to determine if and when the communication device 121 or corresponding device user 108 establishes wireless interface A121-2 to support possible wireless tethering to other communication devices.

In one embodiment, the notification 410 transmitted by agent 425 (or other suitable entity) indicates attributes of wireless interface A121-2 detected as being newly setup on the communication device 121. In such an instance, communication of the notification 410 from agent 425 over a combination of the wireless communication link 127-1, communication link 135, etc., to one or more of gateway 140, wireless station 142, communication management resource 141, communication management resource 150, etc., provides notification of the wireless interface A121-2 and its potential ability to provide tethering. In one embodiment, this action alone of setting up tethering capability (as indicated by the agent 425) may be sufficient to cause the communication management resource 150 and/or communication management resource 141 (of gateway 140) to reduce bandwidth associated with the wireless communication link 127-1 and/or communication link 135.

Figure 5:
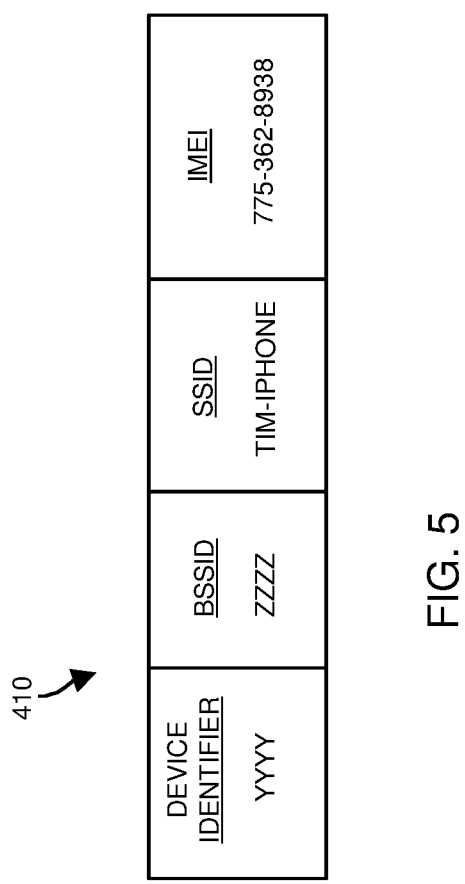
FIG. 5 is an example diagram illustrating a notification including attributes associated with a wireless interface supported by the first communication device according to embodiments herein.

FIG. 5 is an example diagram illustrating notification of a wireless interface supported by the first communication device according to embodiments herein.

As shown in this example embodiment, the notification 410 includes information about the wireless interface A121-1 such as unique network address YYYY (such as MAC address supporting communications with the wireless station 142) assigned to the wireless interference A121-1 of the first communication device 121. In one embodiment, the communication management resources 141, 150, etc., receive the notification 410 conveyed over wireless communication link 127-1.

In further example embodiments, the attributes of the wireless interface A121-2 and corresponding communication device 121 include: i) a first unique network address YYYY used by the first communication device 121 to establish the wireless communication link 127-1, and ii) a second unique network address ZZZZ (such as MAC network address or other type of assigned network address) assigned to the wireless interface A121-2 to wirelessly communicate data to support communications with a second communication device.

The configuration information 410 further includes a unique identifier value such as a phone number (such as 775-362-8938) or other suitable value associated with the communication device 121. As previously discussed, the unique identifier value can be used to notify other wireless network service providers of the wireless tethering capability provided by the communication device 121. If desired, the second wireless network service provider adjusts bandwidth provided to the communication device 121 if tethering capability or actual tethering is detected. (see FIG. 7 for an example).

Figure 6:
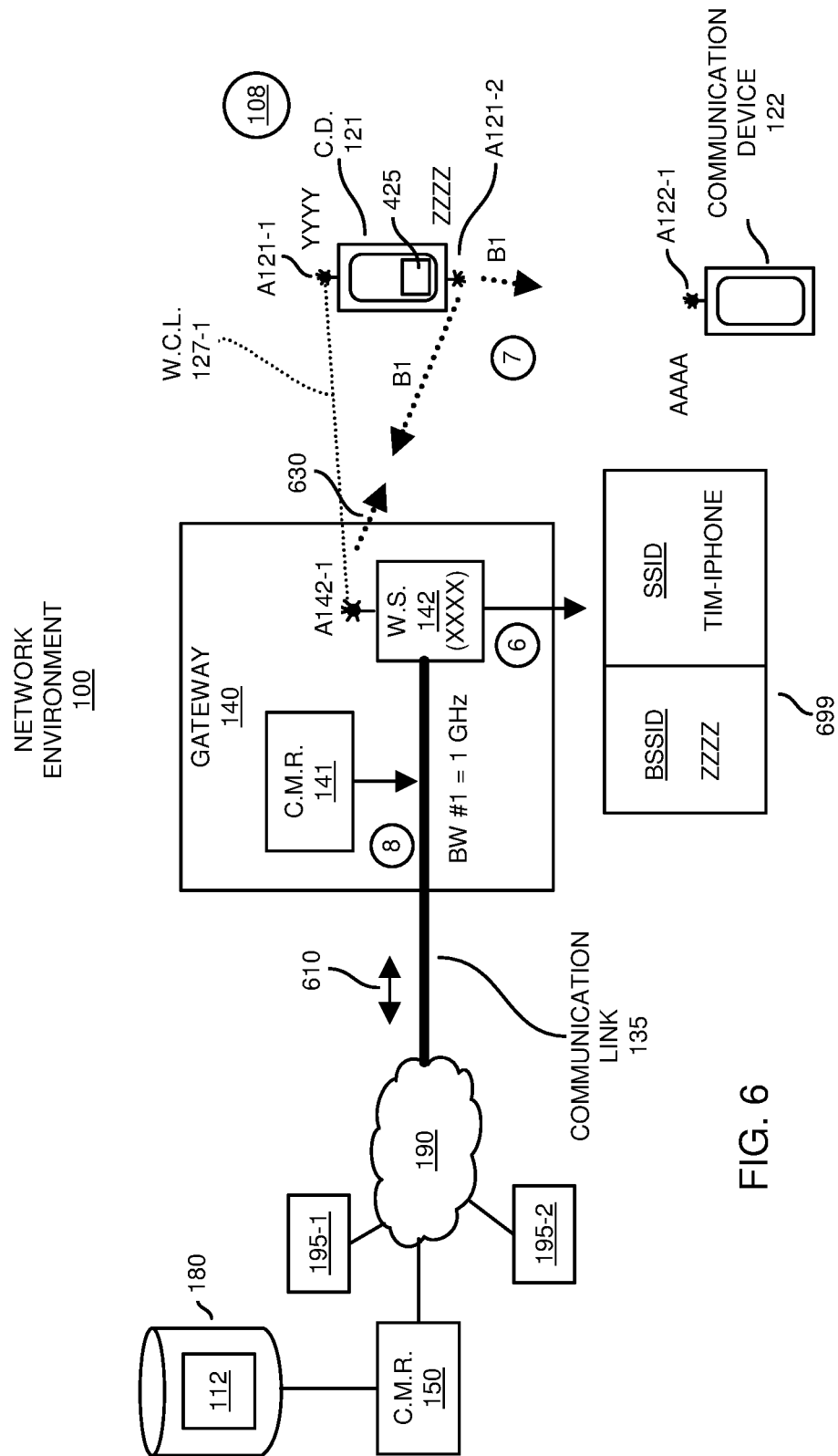
FIG. 6 is an example diagram illustrating receipt of wireless interface settings associated with the first communication device and receipt of a wireless signal indicating availability of wireless services by the first communication device according to embodiments herein.

FIG. 6 is an example diagram illustrating receipt of wireless interface settings associated with the first communication device and receipt of a wireless signal indicating availability of wireless services by the first communication device according to embodiments herein.

In operation #6, via the communications 610, the gateway 140 receives notification of configuration information 699 (such as all or a portion of the notification 410) from the communication management resource 150. As previously discussed, the notification 410 indicates respective attributes (such as BSSID=ZZZZ, SSID=TIM-IPHONE) of the wireless interface A121-2 of communication device 121. In one embodiment, receipt of such information notifies the gateway 140 to monitor a respective condition in which the communication device 121 transmits any beacons advertising availability of a respective wireless service having attributes as specified by the configuration/settings information 699.

Further in operation #6, the wireless station 142 of gateway 140 monitors for presence of wireless communications (such as wireless signal B1) from the communication device 121. The wireless interface A121-2 may be configured to automatically and periodically broadcast respective wireless signals B1 to the network environment 100.

Additionally, or alternatively, note that the wireless station 142 of gateway 140 can be configured to wirelessly transmit a respective one or more probe request communications 630 into network environment 100. The probe request communications prompt any available wireless stations to transmit information indicating their presence.

In operation #7, via wireless interface A121-2, the first communication device 121 transmits (wirelessly broadcasts) a wireless communication B1 (such as a beacon) from the wireless interface A121-2 of the first communication device 121. The wireless communication B1 (wireless signal) advertises availability of the wireless connection service offered by the communication device 121 via wireless interface A121-2.

As previously discussed, in one embodiment, the wireless station 142 wirelessly transmits a probe request 630 from the gateway 140 and receives a wireless signal B1 from the wireless interface A121-2 of the first communication device 121. The wireless communication B1 is a probe response or beacon communicated from the wireless interface A121-1 and includes a BSSID=ZZZZ and network name or SSID=TIM-IPHONE associated with the wireless interface A121-2. As previously mentioned, the wireless communication B1 may be transmitted periodically from the wireless interface A121-1 or generated in response to receiving probe request 630.

In operation #8, the communication management resource 141 or other suitable entity of gateway 140 matches the information in the wireless communication B1 to the configuration information 699. For example, in one embodiment, the wireless communication B1 includes a BSSID value=ZZZZ and an SSID value of TIM-IPHONE. In response to detecting that the wireless communication B1 includes information matching configuration information 699, via communications 610, the communication management resource 141 of the gateway 140 provides notification of the advertisement of wireless services by communication device 121 to the communication management resource 150. In such an instance, the communication management resource 150 is notified that the communication device 121 operates in or advertises availability of a wireless tethering service.

FIG. 7 is an example diagram illustrating a bandwidth adjustment applied to wireless access provided to a first communication device in response to detecting the first communication device providing tethering connectivity according to embodiments herein.

In operation #9, the gateway 140 receives a respective command (from communication management resource 150 or other suitable entity) to adjust a respective bandwidth associated with the communication link 135 and/or wireless communication link 127-1 in response to detecting that communication device 121 operates as a wireless network service provider (via wireless interface A121-2) to other communication devices. In this example embodiment, the communication management resource 150 reduces a bandwidth from 1 GHz to 100 MHz (or other suitable value) because the communication device 121 is operating in or has advertised availability of a wireless tethering mode.

Thus, in further example embodiments, in response to detecting the availability of the wireless connection service advertised via a wireless signal B1 transmitted from the wireless interface A121-2 of the first communication device 121, the communication management resource 141 of the gateway 140 applies a data rate adjustment to the wireless communication link 127-1 and/or communication link 135.

For example, in one embodiment, the gateway 140 provides a first data rate service of 1 GHz over the communication link 135 and wireless communication link 127-1 prior to the gateway 140 receiving wireless signal B1 indicating tethering. The communication management resource 141 and/or gateway 140 provides a second data rate service of 100 MHz over the wireless communication link 127-1 and/or communication link 135 subsequent to receiving the wireless communication B1 indicating the wireless connection service (tethering service) advertised by the wireless interface A121-1 of the first communication device 121.

In operation #10, in accordance with further example embodiments, in response to transmitting the wireless communication B1 from the wireless interface A121-2 the first communication device 121 receives a communication from a second communication device 122 in the network environment 100 to establish a respective wireless communication link. In response to receiving the request, the communication device 121 establishes a wireless communication link 127-2 between the wireless interface A121-2 of the first communication device 121 and the wireless interface A122-1 of the second communication device 122.

In operation #11, the first communication device 121 then receives data 710 wirelessly communicated in respective wireless communications from the second communication device 122 over the second wireless communication link 127-2 to the first communication device 121. The first communication device 121 then communicates the data 710 over the first wireless communication link 127-1 through the gateway 140 to the remote network 190 (such as to one or more server resources 195). The server resources communicate with data in a reverse direction through gateway 140 and communication device 121 to the communication device 122. Thus, the first communication device 121 serves as a wireless access point to the second communication device 121 and provides the second communication device 122 access to the remote network 190.

In this example embodiment, the wireless interface A121-1 supports wireless connectivity provided by a first wireless network service provider WNSP #1. In one embodiment, the communication device 121 further includes antenna hardware A721 (i.e., a wireless interface) supporting communications over a respective cellular network such as wireless network 790 (such as supporting one or more wireless communication protocols such as LTE, 4G, 5G, etc.) controlled and operated by a second wireless network service provider WNSP #2. Thus, the communication device 121 also has the ability to provide the tethered communication device 122 access to the remote network via communications over wireless communication link 727 established between the antenna hardware A721 and wireless station 731. In operation #11.1, the communication management resource 150 (or other suitable entity) in network environment 100 notifies the communication management resource 750 associated with the wireless network 790 that the communication device 121 supports wireless tethering services via communications 755. In operation 11.2, in response to receiving notification that the communication device 121 provides or advertises tethering services, the communication management resource 750 controls wireless network 790 and corresponding wireless network 790 to limit or adjust bandwidth provided to the communication device 121 over the wireless communication link 727.

As previously discussed, note that as an alternative to decreasing the bandwidth in response to detection of tethering, embodiments herein include increasing a bandwidth provided to the data communication device 121 in response to detecting implementation of a tethering mode. For example, gateway 140 can be configured to provide a bandwidth limit of 200 MHz during a non-tethering mode and 500 MHz during the tethering mode. In a similar manner as previously discussed, in this latter embodiment, the user 108 of the first communication device 121 may be charged an extra fee to operate in the tethering mode in which the first communication device 121 is provided additional bandwidth (such as over wireless communication link 727 and wireless network 790) between the communication device 121 and the remote network 190 to support wireless communications.

Figure 8:
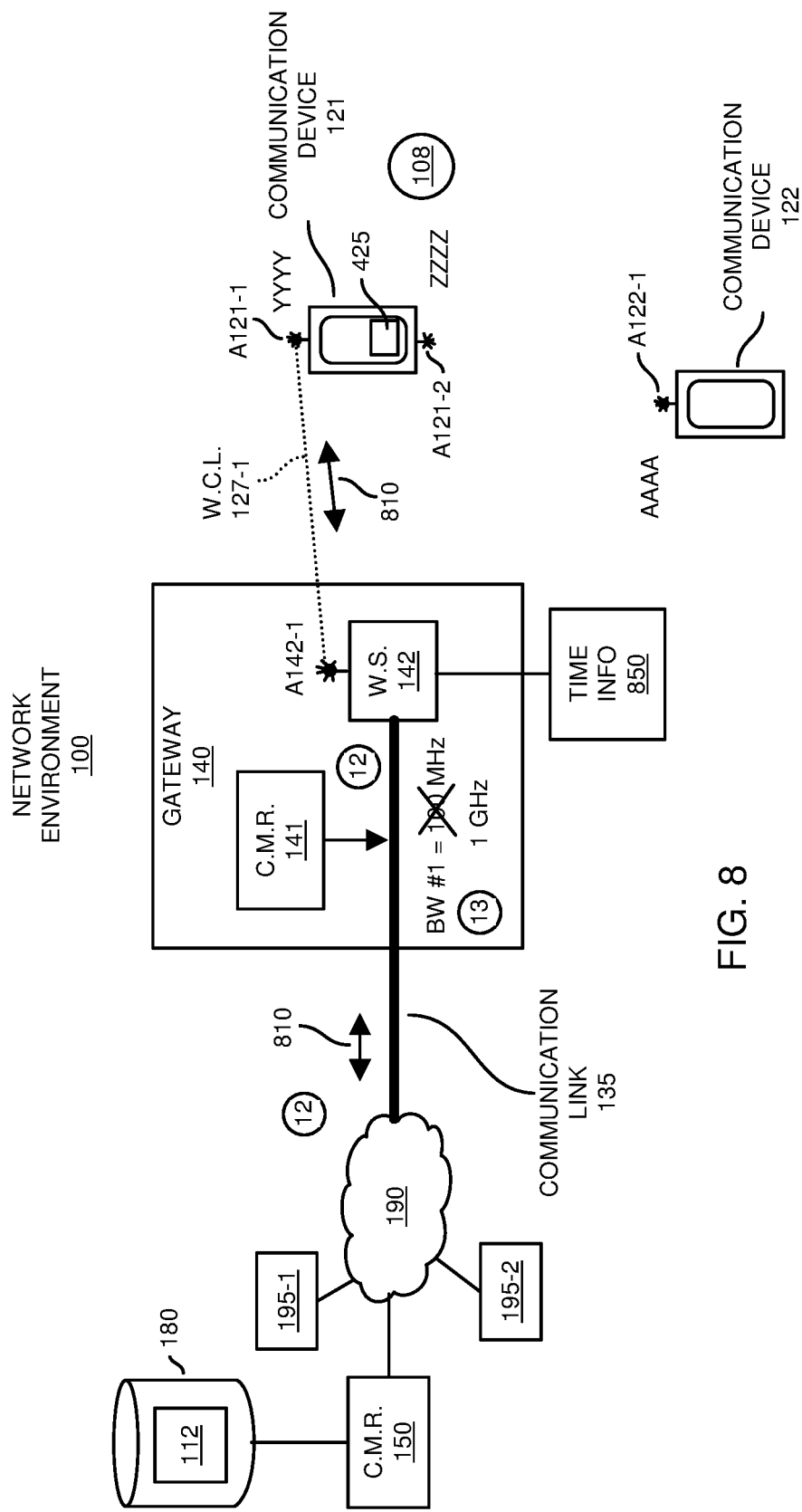
FIG. 8 is an example diagram illustrating a bandwidth adjustment applied to wireless access provided to a first communication device in response to detecting that the first communication device discontinues providing tethering capability according to embodiments herein.

FIG. 8 is an example diagram illustrating a bandwidth adjustment applied to wireless access provided to a first communication device in response to detecting that the first communication device discontinues providing tethering connectivity according to embodiments herein.

In accordance with yet further example embodiments, the wireless station 142 of gateway 140 receives time information 850 indicating a time value such as 120 seconds or other suitable value. The wireless station 142 then monitors for wireless signals B1 from the communication device 121.

In response to detecting a condition in which the wireless interface A121-1 of the first communication device 121 does not advertise the availability of the wireless connection service (associated with A121-2) via wireless signal B1 for a duration of time (such as 120 seconds) as specified by the time value, the gateway 140 applies a data rate adjustment to the wireless communication link 127-1 and/or communication link 135.

As previously discussed, the gateway 140 can be configured to provide a data rate service of 100 MHz over the wireless communication link 127-1 and/or communication link 135 in response to detecting tethering capability. The gateway 140 provides a data rate service of 1 GHz over the wireless communication link 127-1 and/or communication link 135 subsequent to detecting the condition that the communication device 121 no longer advertises a respective wireless tethering service from wireless interface A121-2 for more than 120 seconds.

Figure 9:
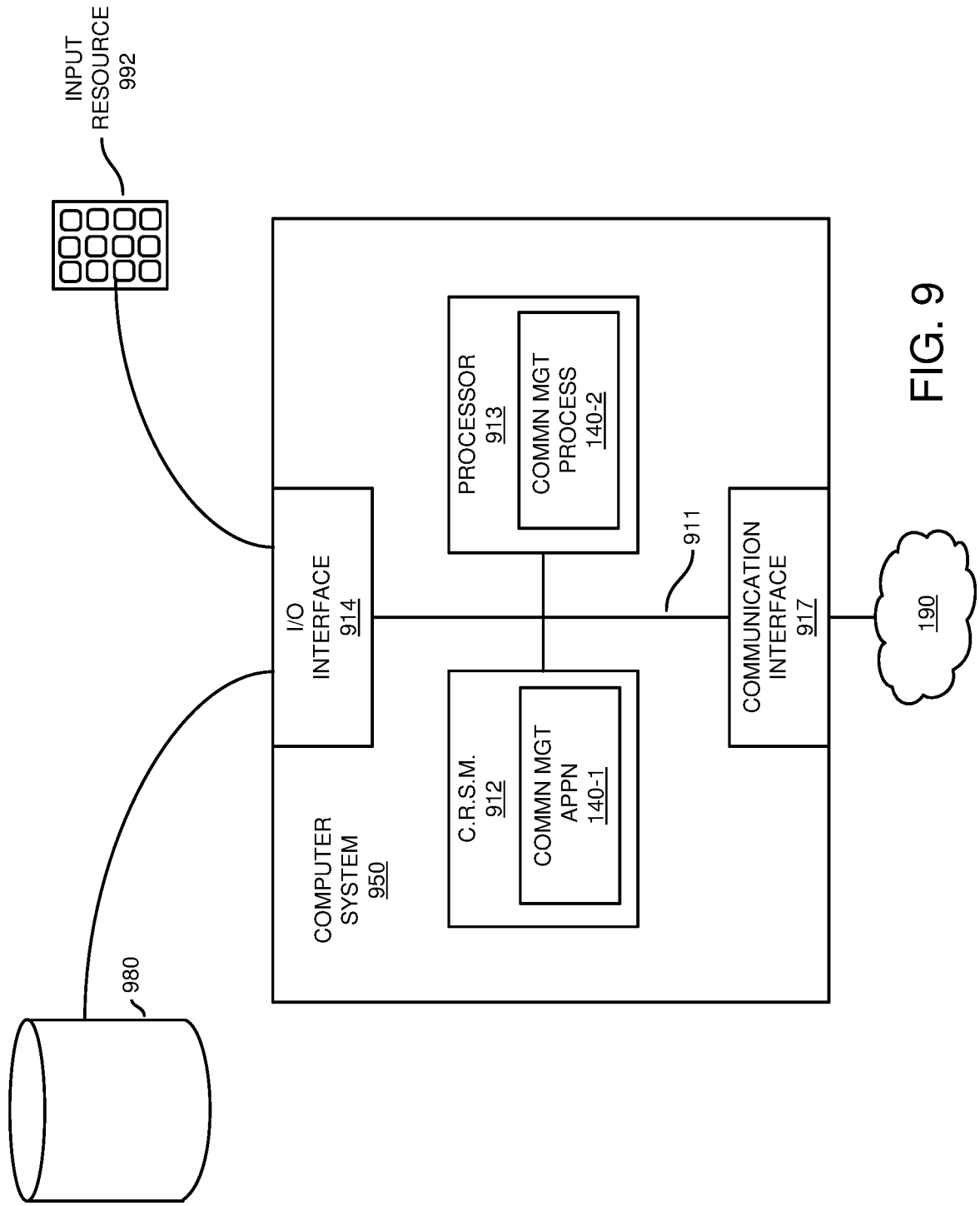
FIG. 9 is a diagram illustrating example computer architecture to execute one or more operations according to embodiments herein.

FIG. 9 is an example block diagram of a computer system for implementing any of the operations as previously discussed according to embodiments herein.

Any of the resources (such as gateway 140, communication management resource 141, communication management resource 150, wireless station 142, communication device 121, communication device 122, etc.) as discussed herein can be configured to include computer processor hardware and/or corresponding executable instructions to carry out the different operations as discussed herein.

As shown, computer system 950 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
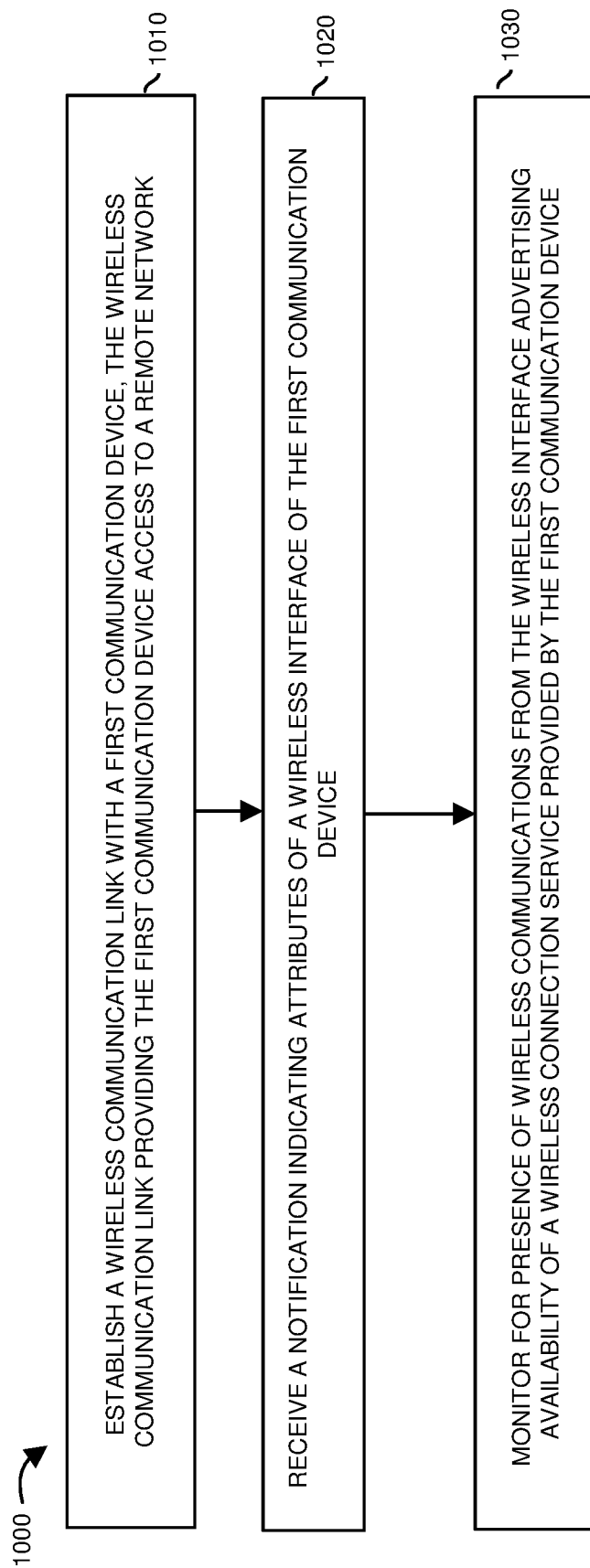
FIG. 10 is an example diagram illustrating a method according to embodiments herein.
Figure 11:
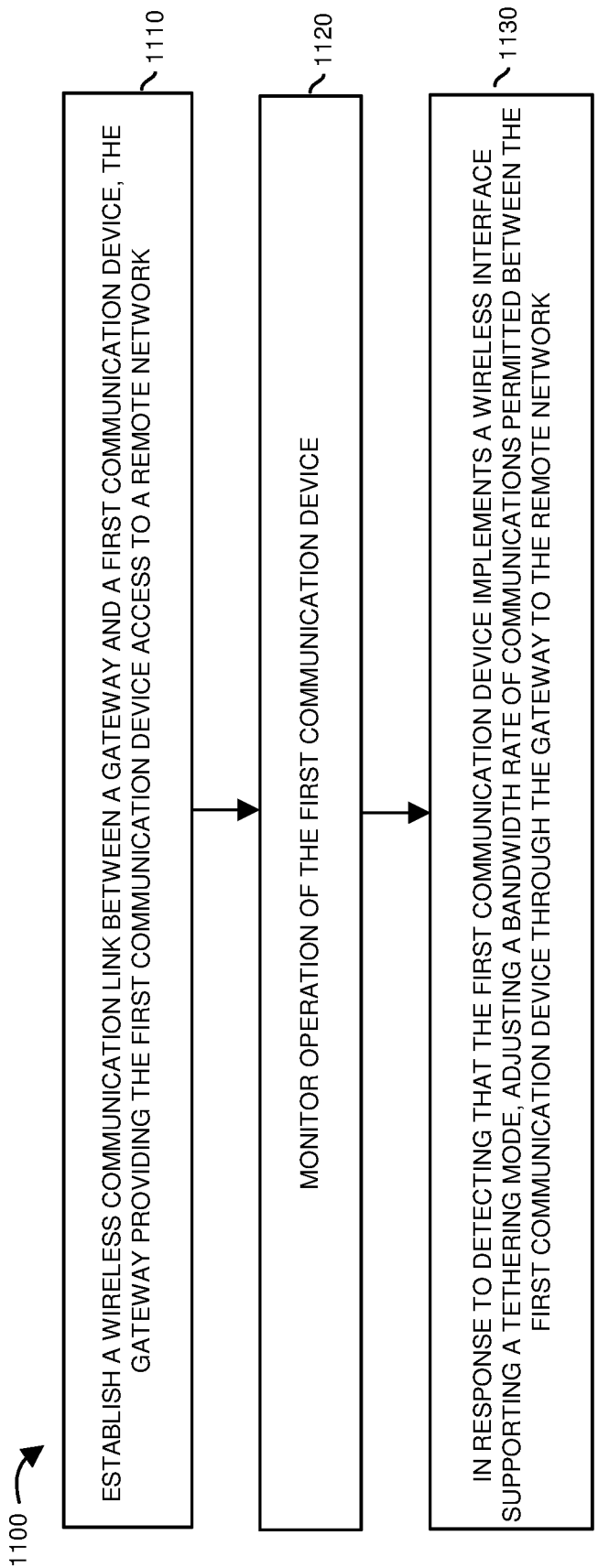
FIG. 11 is an example diagram illustrating a method according to embodiments herein.

FIG. 10 is a flowchart 1000 illustrating an example method according to embodiments. Note that there will be some overlap with respect to concepts as discussed above.

In processing operation 1010, gateway 140 establishes a wireless communication link 127-1 with a first communication device 121. The wireless communication link 127-1 provides the first communication device 121 access to a remote network 190.

In processing operation 1020, the gateway 140 receives a notification indicating attributes of a wireless interface A2 of the first communication device 121.

In processing operation 1030, the gateway 140 monitors for presence of wireless communications from the wireless interface A2 advertising availability of a wireless connection service provided by the first communication device 121.

In processing operation 1040, in response to detecting the availability of the wireless connection service advertised via a wireless communication transmitted from the wireless interface A2 of the first communication device 121, the gateway 140 applies a data rate adjustment to the wireless communication link 135.

FIG. 10 is a flowchart 1000 illustrating an example method according to embodiments. Note that there will be some overlap with respect to concepts as discussed above.

In processing operation 1010, gateway 140 establishes a wireless communication link 127-1 between gateway 140 and a first communication device 121. The gateway 140 provides the first communication device 121 access to a remote network 190.

In processing operation 1020, the gateway 140 or other suitable entity monitors operation of the first communication device 121.

In processing operation 1030, in response to detecting that the first communication device 121 implements a wireless interface A121-2 supporting a tethering mode, the gateway 140 adjusts (such as limits) a bandwidth rate of communications permitted between the first communication device 121 through the gateway 140 to the remote network 190.

Note again that techniques herein are well suited to facilitate control of tethering in a wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   at a first mobile communication device:
      via a first wireless interface of the first mobile communication device, establishing a wireless communication link with a wireless access point, the wireless communication link providing the first mobile communication device access to a remote network;
      at the first mobile communication device, implementing a second wireless interface;
      via a notification wirelessly transmitted from the second wireless interface of the first mobile communication device, advertising availability of a wireless service provided by the second wireless interface, the notification wirelessly transmitted from the mobile communication device other than over the wireless communication link; and
      wherein a data rate of communicating from the first wireless interface over the first wireless communication link through the wireless access point is adjusted based on the notification wirelessly transmitted from the first mobile communication device.

2. The method as in claim 1, wherein a data rate adjustment is applied to the wireless communication link to control the data rate of communications between the first mobile communication device through the wireless access point to the remote network in response to the first mobile communication device wirelessly advertising the availability of the wireless service via the notification.

3. The method as in claim 2, wherein the first mobile communication device is provided a first data rate service over the wireless communication link prior to the first mobile communication device wirelessly advertising the availability of the wireless service provided by the second wireless interface.

4. The method as in claim 3, wherein the first mobile communication device is provided a second data rate service over the wireless communication link subsequent to the first mobile communication device wirelessly advertising the availability of the wireless service provided by the second wireless interface.

5. The method as in claim 1 further comprising:
generating the notification as a wireless notification including attributes of the second wireless interface.

6. The method as in claim 1 further comprising:
generating the notification to include: i) a first unique network address of the first wireless interface, and ii) a second unique network address assigned to the second wireless interface to wirelessly communicate data from the first mobile communication device to a second mobile communication device.

7. The method as in claim 1 further comprising:
at the second wireless interface of the mobile communication device: i) receiving a probe request, and ii) in response to the probe request, wirelessly transmitting the notification from the second wireless interface of the first mobile communication device.

8. The method as in claim 1 further comprising:
via the notification, transmitting a unique network address assigned to the second wireless interface of the first mobile communication device.

9. The method as in claim 1, wherein a magnitude of the data rate supported over the wireless communication link and through the wireless access point varies depending on a timing of the first mobile communication device advertising the availability of the wireless service provided by the second wireless interface.

10. The method as in claim 1 further comprising:
in response to wirelessly transmitting the notification from the second wireless interface:
  i) receiving a communication from a second mobile communication device; and
  ii) establishing wireless connectivity between the second wireless interface of the first mobile communication device and the second mobile communication device.

11. The method as in claim 10 further comprising:
at the first mobile communication device, receiving data wirelessly communicated from the second mobile communication device over the wireless connectivity between the second wireless interface of the first mobile communication device and the second mobile communication device; and
from the first mobile communication device, communicating the data over the wireless communication link through the wireless access point to the remote network.

12. The method as in claim 1, wherein the notification is wirelessly received by the wireless access point; and
wherein the wireless access point is operative to adjust the data rate in response to receiving the notification advertising the availability of the wireless service provided by the second wireless interface.

13. The method as in claim 1, wherein the data rate of communicating over the wireless communication link is reduced in response to the wireless access point receiving the notification wirelessly transmitted from the first mobile communication device.

14. The method as in claim 1, wherein the data rate of communicating over the wireless communication link is increased in response to the wireless access point receiving the notification wirelessly transmitted from the first mobile communication device.

15. The method as in claim 1 further comprising:
at the second wireless interface, receiving a communication from the wireless access point.

16. The method as in claim 15 further comprising:
in response to receiving the communication from the wireless access point, wirelessly transmitting the notification from the first mobile communication device.

17. The method as in claim 16, wherein the communication from the wireless access point is a probe request transmitted by the wireless access point; and
wherein the notification is a probe response transmitted from the second wireless interface of the first mobile communication device.

18. The method as in claim 1, wherein the wireless communication link is established between antenna hardware of the wireless access point and the first wireless interface of the first mobile communication device; and
wherein the wireless access point receives the notification at the antenna hardware of the wireless access point.

19. The method as in claim 1 further comprising:
at the first mobile communication device, subsequent to wirelessly transmitting the notification, discontinuing advertisement of the availability of the wireless service provided by the second wireless interface; and
wherein the data rate of communicating is adjusted in response to the discontinued advertisement for a duration of time greater than a threshold level.

20. The method as in claim 1, wherein the implementing the second wireless interface includes: prior to the first mobile communication device wirelessly transmitting the notification from the second wireless interface, transmitting a message from the first mobile communication device to the wireless access point over the wireless communication link, the message indicating a unique identity value assigned to the second wireless interface and configuration of the first mobile communication device to support a tethering mode via the second wireless interface.

21. The method as in claim 20, wherein receipt of the message by the wireless access point prompts the wireless access point to monitor for presence of the notification from the first mobile communication device; and
wherein the notification wirelessly transmitted from the first mobile communication device includes the unique identity value assigned to the second wireless interface.

22. A system comprising:
a first mobile communication device operative to:
  via a first wireless interface of the first mobile communication device, establish a wireless communication link with a wireless access point, the wireless communication link providing the first mobile communication device access to a remote network;
  implement a second wireless interface;
  via a notification wirelessly transmitted from the second wireless interface of the first mobile communication device, advertise availability of a wireless service provided by the second wireless interface, the notification wirelessly transmitted from the mobile communication device other than over the wireless communication link; and
  wherein a data rate of communicating from the first wireless interface over the first wireless communication link through the wireless access point is adjusted based on the notification wirelessly transmitted from the first mobile communication device.

23. The system as in claim 22, wherein a data rate adjustment is applied to the wireless communication link to control the data rate of communications between the first mobile communication device through the wireless access point to the remote network in response to the first mobile communication device wirelessly advertising the availability of the wireless service.

24. The system as in claim 23, wherein the first mobile communication device is provided a first data rate service over the wireless communication link prior to the first mobile communication device wirelessly advertising the availability of the wireless service provided by the second wireless interface.

25. The system as in claim 24, wherein the first communication device is provided a second data rate service over the wireless communication link subsequent to the first mobile communication device wirelessly advertising the availability of the wireless service provided by the second wireless interface.

26. The system as in claim 22, wherein the first mobile communication device is further operative to:
   generate the notification to include attributes of the second wireless interface.

27. The system as in claim 22, wherein the first mobile communication device is further operative to:
   generate the notification to include: i) a first unique network address of the first wireless interface, and ii) a second unique network address assigned to the second wireless interface to wirelessly communicate data from the first mobile communication device to a second mobile communication device.

28. The system as in claim 22, wherein the first mobile communication device is further operative to:
   at the second wireless interface of the mobile communication device: i) receive a probe request, and ii) in response to the probe request, wirelessly transmit the notification from the second wireless interface of the first mobile communication device.

29. The system as in claim 22, wherein a magnitude of a respective data rate supported over the wireless communication link and through the first wireless access point varies depending on timing of the first mobile communication device advertising the availability of the wireless service provided by the second wireless interface.

30. The system as in claim 22, wherein the first mobile communication device is further operative to:
   in response to wirelessly transmitting the notification from the second wireless interface:
      i) receive a communication from a second mobile communication device; and
      ii) establish wireless connectivity between the second wireless interface of the first mobile communication device and the second mobile communication device.

31. The system as in claim 30, wherein the first mobile communication device is further operative to:
   at the first mobile communication device, receive data wirelessly communicated from the second mobile communication device over the wireless connectivity; and
   from the first mobile communication device, communicate the data over the wireless communication link through the wireless access point to the remote network.

32. A method comprising:
   establishing a wireless communication link between a gateway and a first mobile communication device via a first wireless interface of the first mobile communication device, the gateway providing the first mobile communication device access to a remote network;
   monitoring operation of the first mobile communication device;
   via the monitoring, by the gateway, receiving a notification wirelessly transmitted from a second wireless interface of the first mobile communication device, the notification advertising availability of a wireless service provided by the first mobile communication device, wherein the notification is transmitted from the mobile communication device other than over the wireless communication link; and
   in response to detecting that the first mobile communication device supports the wireless service via the second wireless interface, where the wireless service is a tethering mode as indicated by the notification, adjusting a bandwidth rate of communications provided between the first mobile communication device through the gateway to the remote network.

* * * * *